(12) United States Patent
Lee et al.

(10) Patent No.: US 7,215,367 B2
(45) Date of Patent: May 8, 2007

(54) IMAGE DATA CONTROL SYSTEM AND METHOD FOR CAPTURING AND DISPLAYING AN ORIGINAL IMAGE OF AN OBJECT

(75) Inventors: Sung Min Lee, Seoul (KR); Sang Hyung Park, Sungnam-si (KR); Hyeong Ik Yun, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 667 days.

(21) Appl. No.: 10/200,801

(22) Filed: Jul. 23, 2002

(65) Prior Publication Data

US 2003/0016292 A1    Jan. 23, 2003

(30) Foreign Application Priority Data

Jul. 23, 2001    (KR)    ............................ 2001-44137
Jul. 26, 2001    (KR)    ............................ 2001-45240

(51) Int. Cl.
*H04N 5/76*    (2006.01)
(52) U.S. Cl. ..................... 348/231.99; 348/211.13; 348/231.9
(58) Field of Classification Search .............. None
See application file for complete search history.

(56) References Cited

U.S. PATENT DOCUMENTS 5,550,588 A * 8/1996 Hayashi ................. 348/231.99
6,535,243 B1 * 3/2003 Tullis ....................... 348/207.1
6,661,451 B1 * 12/2003 Kijima et al. ............ 348/220.1
2001/0050720 A1 * 12/2001 Karube et al. .............. 348/373

\* cited by examiner

*Primary Examiner*—Ngoc-Yen Vu
*Assistant Examiner*—Anthony J. Daniels
(74) *Attorney, Agent, or Firm*—Blackwell Sanders Peper Martin, LLP; Changhoon Lee (57) ABSTRACT

A system for controlling original image data of an object captured thereby and a method using the system. The system includes a digital camera and an image display terminal. The digital camera forms image line data having a plurality of image line data units representing the original image to generate inverted unit images, and combines the inverted unit images to generate a partly inverted image file. In this case, the digital camera generates each inverted unit image by reversely storing the image line data by a predetermined number of the image line data units. Also, the digital camera reduces each of the image signals by a predetermined size. The image display terminal is rotatably connected with the digital camera. The image display terminal reversely recombines the inverted unit images included in the partly inverted image file, and generates a new image file including an inverted image to be displayed.

15 Claims, 10 Drawing Sheets

IMAGE DATA CONTROL SYSTEM AND METHOD FOR CAPTURING AND DISPLAYING AN ORIGINAL IMAGE OF AN OBJECT

BACKGROUND OF THE INVENTION

1. Field of the Invention

The invention relates to a system and a method for capturing and displaying an image of an object, and more particularly, to an image data control system for inverting and/or reducing an image of an object captured thereby, and an image data control method using the same.

2. Description of the Related Art

A digital camera may be rotatably connected to an image display terminal, such as a mobile phone, a PDA (Personal Digital Assistant), a personal computer, etc., and transfer an original image (i.e., image data) of an object captured thereby to the image display terminal. Such digital camera generally compresses image data to form a compressed image file having a data compression format, and transfers the compressed image file to the image display terminal. In this case, the image display terminal functions as a viewfinder displaying the image captured by the digital camera, so that a user confirms the image in visual and photographs a proper image. But, when the digital camera is rotated at 180° so as to be inverted, it is difficult that the user photographs a proper image because the displayed image represents an inverted state of the object. Therefore, a system for resolving the difficulty has been introduced. The system can inversely display the image captured by the digital camera in response to a command externally inputted.

Figure 1:
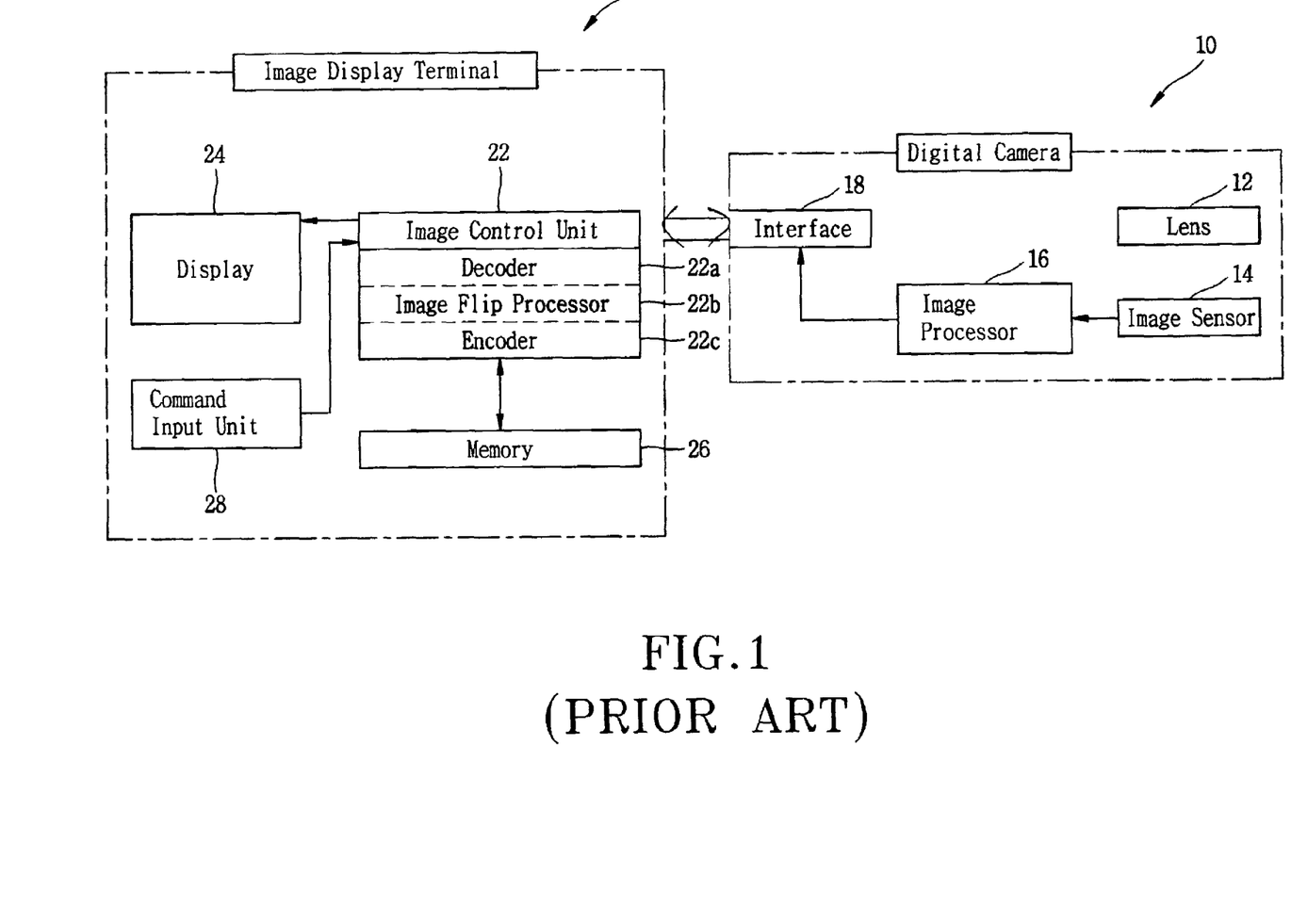
FIG. 1 is a block diagram showing a conventional image data control system.

FIG. 1 is a block diagram for explaining a conventional image data control system. Referring to FIG. 1, the conventional system includes a digital camera 10 and an image display terminal 20.

The digital camera 10 has a lens 12, an image sensor 14, an image processor 16 and an interface 18. The image sensor 14 detects an image captured by the lens 12, and generates image signals corresponding to the captured image. Then, the image sensor 14 provides the image signals to the image processor 16. The image processor 16 has multiple buffer lines. The image processor 16 forms image line data on the basis of the image signals provided from the image sensor 14, and then successively stores the image line data therein. For example, when the image processor 16 has $0(Zero)^{th}$ to $7^{th}$ buffer lines and forms the image line data with a predetermined number of data units such as $0(Zero)^{th}$ to $7^{th}$ image line data, the image processor 16 stores the $0^{th}$ to $7^{th}$ image line data into the $0^{th}$ to $7^{th}$ buffer lines, respectively. Also, the image processor 16 compresses the stored image line data to generate a compressed image file including the image of the object captured by the lens 12, and then transfers the compressed image file to the image display terminal 20 via the interface 18.

Figure 2:
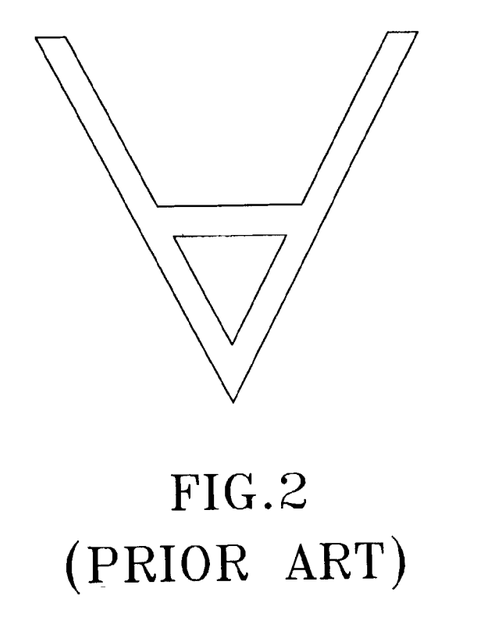
FIG. 2 illustrates an image displayed by an image display terminal shown in FIG. 1, when a digital camera in the conventional system is inverted and captures the image of an A-shaped object.

The image display terminal 20 has an image control unit 22, a display 24, a memory 26 and a command input unit 28. The image control unit 22 provides the display 24 and/or the memory 26 with the compressed image file transferred from the digital camera 10. The display 24 displays the image included in the compressed image file. For example, when the digital camera 10 is inverted and captures an image of an A-shaped object, the display 24 displays a ∀-shaped image as shown in FIG. 2.

Figure 3:
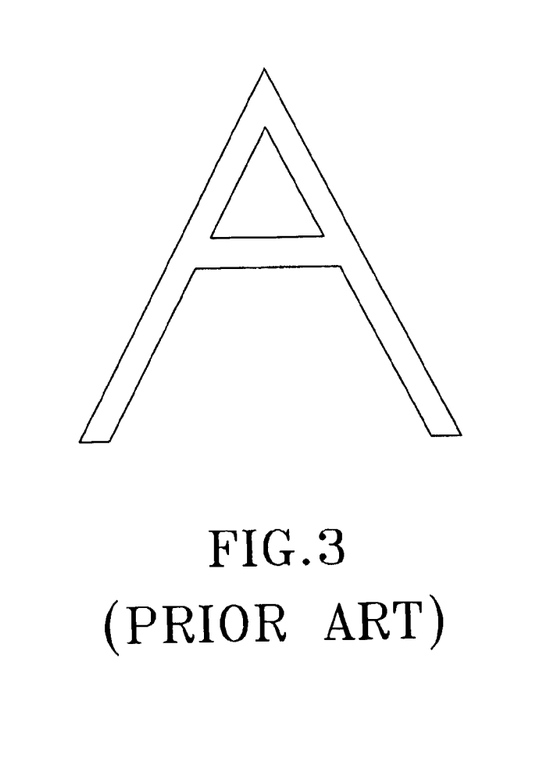
FIG. 3 represents an image inverted by the image display terminal shown in FIG. 1, when a vertical flip command is inputted to the conventional system.

And, when a vertical flip command for inverting the captured image is inputted to the command input unit 28, the image control unit 22 drives a decoder 22a, an image flip processor 22b and an encoder 22c to generate a new compressed image file. The new compressed image file includes the A-shaped image inverting the ∀-shaped image (i.e., the image of the object captured by the digital camera 10). In this case, the decoder 22a decodes the compressed image file transferred from the digital camera 10, and divides the captured image into the multiple data units of the image line data. The image flip processor 22b reversely rearranges the multiple data units of the image line data divided by the decoder 22a. The encoder 22c compresses the rearranged image line data to generate the new compressed image file. Then, the image control unit 22 provides the new compressed image file to the display 24 and/or the memory 26, and the display 24 displays the original image as shown in FIG. 3.

The memory 26 receives the (new) compressed image file from the image control unit 22, and stores the same therein.

However, according to the conventional system, since the image control unit 22 requires the decoder 22a, the image flip processor 22b and the encoder 22c, there are disadvantages such that manufacturing cost and power consumption are increased. Also, when the vertical flip command is inputted, a time interval for inverting the captured image is increased because the multiple data units of the image line data are rearranged.

Further, the conventional system cannot adjust the size of an image captured by the digital camera. Therefore, when the size of a captured image is larger than that being able to be displayed on the display, there is still another disadvantage in the conventional system that a user cannot confirm the overall image captured.

SUMMARY OF THE INVENTION

To overcome the above and other disadvantages, the invention provides an image data control system being able to easily invert an image of an object captured thereby, and reduces the size of the captured image.

The invention also provides an image data control method using the system.

In one aspect of the invention, there is provided an image data control system for capturing and displaying an original image of an object. The image data control system includes a digital camera and an image display terminal. The digital camera forms image line data having multiple image line data units representing the original image, generates inverted unit images each of which is obtained by reversely storing the image line data by a predetermined number of the image line data units, and combines the inverted unit images to generate a partly inverted image file. The image display terminal is rotatably connected with the digital camera. The image display terminal reversely recombines the inverted unit images included in the partly inverted image file, and generates a new image file including an inverted image. Then, the image display terminal displays the inverted image included in the new image file.

In another aspect of the invention, there is provided an image data control system capturing and displaying an original image of an object. The image data control system includes a digital camera capable of reducing an image size, and an image display terminal for displaying a reduced image. The digital camera forms reduced image line data having multiple image line data units representing the original image, and generates a reduced image file using the reduced image line data. In this case, the reduced image file includes a reduced image having the image size smaller than that of the original image captured. The image display terminal is rotatably connected with the digital camera. The image display terminal receives the reduced image file from the digital camera, and displays the reduced image.

In still another aspect of the invention, there is provided an image data control method using a system for capturing and displaying an original image of an object. The image data control method includes generating image signals corresponding to the original image captured; forming image line data using the image signals, the image line data having a plurality of image line data units; checking whether a vertical flip command is inputted or not; generating inverted unit images by reversely storing the image line data by a predetermined number of the image line data units, when the vertical flip command is inputted; combining the inverted unit images to generate a partly inverted image file; reversely recombining the inverted unit images included in the partly inverted image file to generate a new image file, the new image file including an inverted image; and displaying the inverted image included in the new image file.

In still another aspect of the invention, there is provided an image data control method using a system for capturing and displaying an original image of an object. The image data control method includes generating image signals corresponding to the original image captured; checking whether an image reduction command is inputted or not; reducing a size of each image signal by a predetermined size, when the image reduction command is inputted; forming image line data using the reduced image signals; generating a reduced image file using the image line data, the reduced image file including an reduced image, the reduced image having an image size smaller than that of the original image; and displaying the reduced image included in the reduced image file.

BRIEF DESCRIPTION OF THE DRAWINGS

The foregoing and further features and advantages of the invention will become more apparent from the following description and the accompanying drawings, in which the same reference numerals indicate the same or corresponding parts.

DETAILED DESCRIPTION OF THE INVENTION

Figure 4:
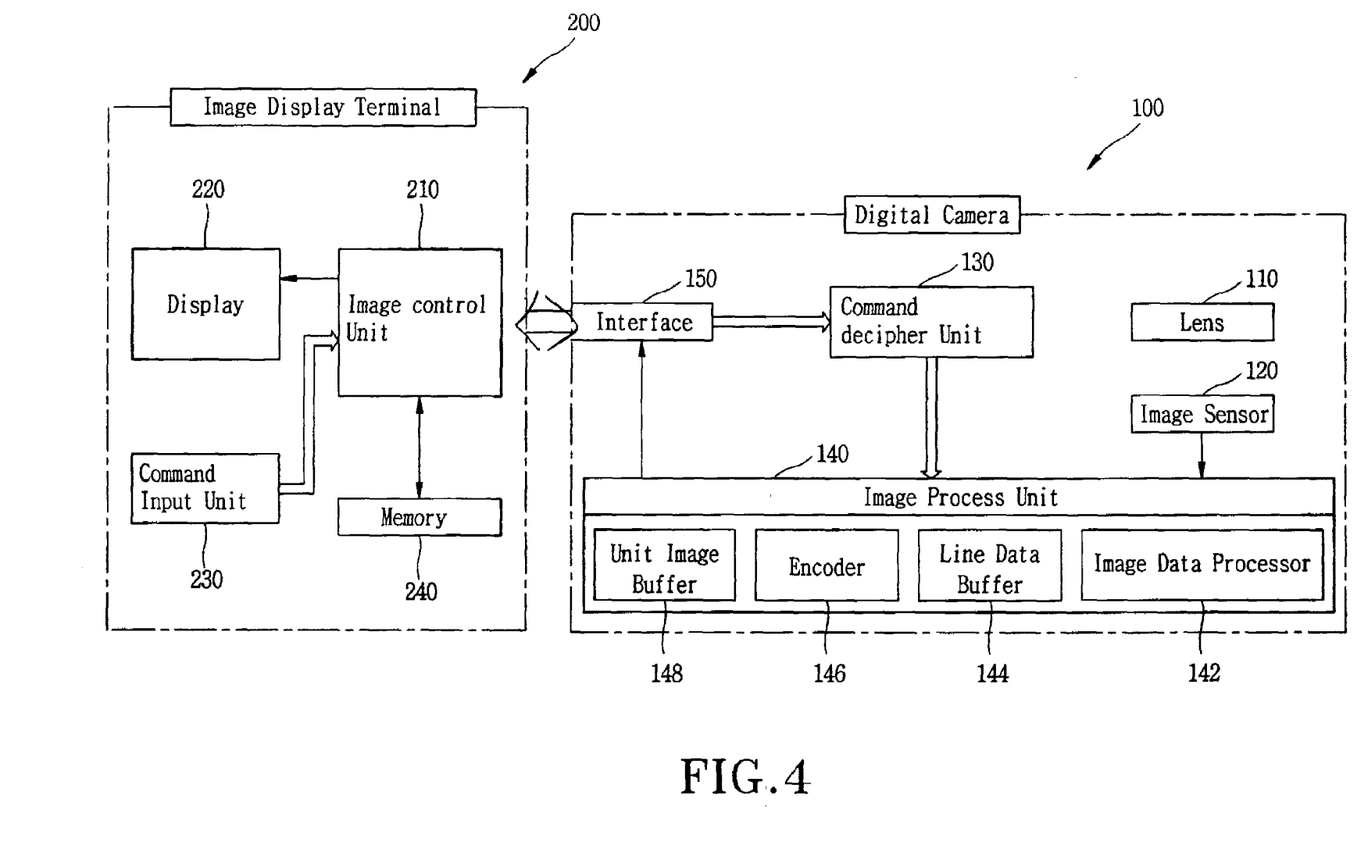
FIG. 4 is a block diagram showing an image data control system according to one exemplary embodiment of the invention.

FIG. 4 is a block diagram showing an image data control system according to one exemplary embodiment of the invention. Referring to FIG. 4, the image data control system includes a digital camera 100 and an image display terminal 200 to which the digital camera 10 is rotatably connected.

The digital camera 100 generates a compressed image file including an image (i.e., image data) of an object captured thereby, and transfers the compressed image file to the image display terminal 200. Then, when either a vertical flip command or an image reduction command is inputted, the digital camera 100 performs image data control operations responsive to the inputted command. That is, when the vertical flip command is inputted to the digital camera 100, the digital camera 100 performs operations for inverting the image. And, when the image reduction command is inputted to the digital camera 100, the digital camera 100 performs operations for reducing a size of the image captured. The digital camera 100 has a lens 110, an image sensor 120, a command decipher unit 130, an image process unit 140 and an interface 150.

The lens 110 captures the image of an object. The image sensor 120 detects the image captured by the lens 110. When the digital camera 100 is rotated at 180° so as to be inverted, the image sensor 120 detects the inverted image of the object. And, the image sensor 120 generates image signals corresponding to the detected image, and then provides the image signals to the image process unit 140.

The command decipher unit 130 deciphers the commands externally inputted, and generates predetermined control signals corresponding to the commands. For example, when the image reduction command is inputted to the digital camera 100, the command decipher unit 130 generates a first control signal. Also, when the vertical flip command is inputted to the digital camera 100, the command decipher unit 130 generates a second control signal. Then, the command decipher unit 130 provides the generated control signal (i.e., either the first or the second control signal) to the image process unit 140. In this embodiment, the digital camera 100 receives the commands from the image display terminal 200 via the interface 150.

The image process unit 140 generates the compressed image file using the image signals provided from the image sensor 120, and transfers the compressed image files to the image display terminal 200 via the interface 150. The compressed image file is a compressed general image file (hereinafter, referred to as a "general image file"), a compressed and reduced image file (hereinafter, referred to as a "reduced image file"), a compressed and partly inverted image file (hereinafter, referred to as a "partly inverted image file"), or a reduced and partly inverted image file depending on a mode of the image data control system. The image process unit 140 reduces the image size by a predetermined size to generate a reduced image file, in response to the first control signal. The image size is equal to or smaller than that being able to be displayed on the image display terminal 200. In this case, the image display terminal 200 displays the overall image captured by the digital camera 100, regardless of the size of the captured image.

Also, the image process unit 140 partly inverts the image of an object to generate a partly inverted image file of the object, in response to the second control signal. The image process unit 140 includes an image data processor 142, a line data buffer 144, an encoder 146 and a unit image buffer 148.

The image data processor 142 forms image line data using the image signals provided from the image sensor 120, and successively outputs the image line data to the line data buffer 144. Then, when the first control signal is received from the command decipher unit 130, the image data processor 142 reduces the size of each image signal, and forms reduced image line data for generating the reduced image file.

The line data buffer 144 has multiple buffer lines, and successively stores the image line data into the buffer lines to generate multiple (e.g., two (2) in this embodiment) unit images. For example, when the image data processor 142 produces image line data units such as $0(Zero)^{th}$ image line data~$15^{th}$ image line data and the line data buffer 144 has $0(Zero)^{th}$ to $7^{th}$ buffer lines, the line data buffer 144 stores the $0^{th}$ to $_7$th image line data into the $0^{th}$ to $7^{th}$ buffer lines, respectively, to generate one unit image. Thereafter, the line data buffer 144 stores the $8^{th}$ to $15^{th}$ image line data into the $0^{th}$ to $7^{th}$ buffer lines, respectively, to generate another unit image. And, the line data buffer 144 provides the two (2) unit images to the encoder 146. The unit images include different portions of the captured image, respectively. On the other hand, when the image line data stored in the line data buffer 144 are the reduced image line data, the line data buffer 144 generates reduced unit images.

Then, when the second control signal is received from the command decipher unit 130, the line data buffer 144 reversely stores the image line data into the buffer lines to generate inverted unit images. For example, when the image data processor 142 forms $0(Zero)^{th}$ image line data~$15^{th}$ image line data and the line data buffer 144 has $0(Zero)^{th}$ to $7^{th}$ buffer lines, the line data buffer 144 stores the $0^{th}$ to $7^{th}$ image line data into the $7^{th}$ to $0^{th}$ buffer lines, respectively, to generate one inverted unit image. Thereafter, the line data buffer 144 stores the $8^{th}$ to $15^{th}$ image line data into the $7^{th}$ to $0^{th}$ buffer lines, respectively, to generate another inverted unit image. And, the line data buffer 144 provides the two (2) inverted unit images to the encoder 146. On the other hand, when the image line data stored in the line data buffer 144 are the reduced image line data, the line data buffer 144 generates reduced and inverted unit images.

The encoder 146 compresses each unit image provided from the line data buffer 144, and generates compressed unit images. Then, the encoder 146 attaches an identification marker (hereinafter, referred to as a "restart marker") at a last portion of each compressed unit image. The encoder 146 successively provides the compressed unit images to the unit image buffer 148.

The unit image buffer 148 successively combines the compressed unit images and attaches a header at a top portion of each combined unit image, generating the compressed image file. Thereafter, the unit image buffer 148 transfers the compressed image file to the image display terminal 200 via the interface 150.

The interface 150 guides the compressed image file into the image display terminal 200. Also, the interface 150 receives operation power and the commands (e.g., the vertical flip command, the image reduction command, etc.) from the image display terminal 200. Therefore, the digital camera 100 is supplied with the operation power from the image display terminal 200 via the interface 150. The interface 150 is implemented with, for example, a UART (Universal Asynchronous Receiver Transmitter), a SPI (Serial Peripheral Interface), or a USB (Universal Serial Bus).

The image display terminal 200 decodes the compressed image file, and displays an original image included in the compressed image file. Also, the image display terminal 200 provides external commands to the digital camera 100 or performs predetermined operations according to the external commands. The image display terminal 200 includes an image control unit 210, a display 220, a command input unit 230 and a memory 240.

The image control unit 210 provides the compressed image file, which is transferred from the digital camera 100, to the display 220. And, when a stock command (or photographing command) is inputted through the command input unit 230, the image control unit 210 transfers the compressed image file into the memory 240. On the other hand, when the vertical flip command is inputted through the command input unit 230, the image control unit 210 recombines the compressed unit images included in the compressed image file in reverse order. That is, the image control unit 210 generates a new compressed image file. The new compressed image file includes an inverted image inverting the original image of the object captured by the digital camera 100. Then, the image control unit 210 provides the new compressed image file to the display 220, or transfers the new compressed image file into the memory 240 in response to the stock command. Also, when an image transfer command is inputted through the command input unit 230, the image control unit 210 searches and retrieves the compressed image file stored in the memory 240, and transfers to a receiver via a predetermined communication module (not shown).

The display 220 displays the image included in the compressed image file provided from the image control unit 210, so that user can visually confirm the image included in the compressed image file or the inverted image included in the new compressed image file. In this case, the display 220 decodes the compressed image file to display the original image. Since the decoding in the display 220 is well-known technique, description for the decoding in the display 220 is omitted in this specification. A Liquid Crystal Display (LCD) device may be employed as the display 220.

The command input unit 230 is formed for a user to input the commands (e.g., the vertical flip command, the image reduction command, the stock command, etc.) for controlling the operations of the digital camera 100 and the image display terminal 200. The command input unit 230 has, for example, key pads for inputting the commands. Since the command input unit 230 having the key pads is already known, detailed description for the command input unit 230 is omitted in this specification.

The memory 240 stores the compressed image files provided from the image control unit 210.

Further, the image display terminal 200 can include an additional element (not shown) similar to the command decipher unit 130 of the digital camera 100. In this case, the additional element deciphers the commands inputted through the command input unit 230, and generates predetermined control signals depending on the commands. And, the additional element provides the generated control signals to the image control unit 210.

Hereinafter, referring to FIGS. 5A to 9B, the image data control method using the system of the invention is described.

Figure 5A:
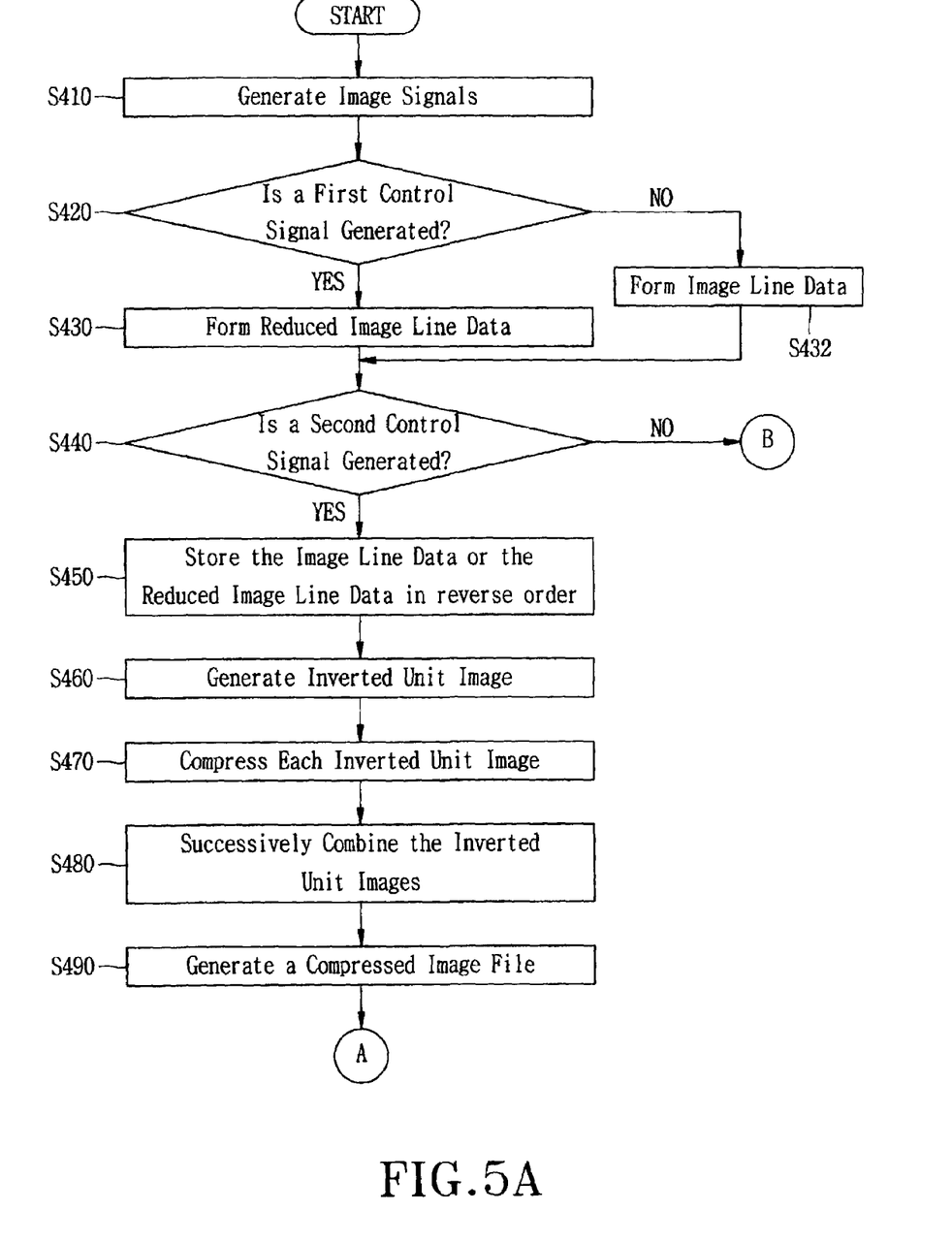
FIGS. 5A to 5C are flowcharts for explaining an image data control method using the image data control system shown in FIG. 4.
Figure 5B:
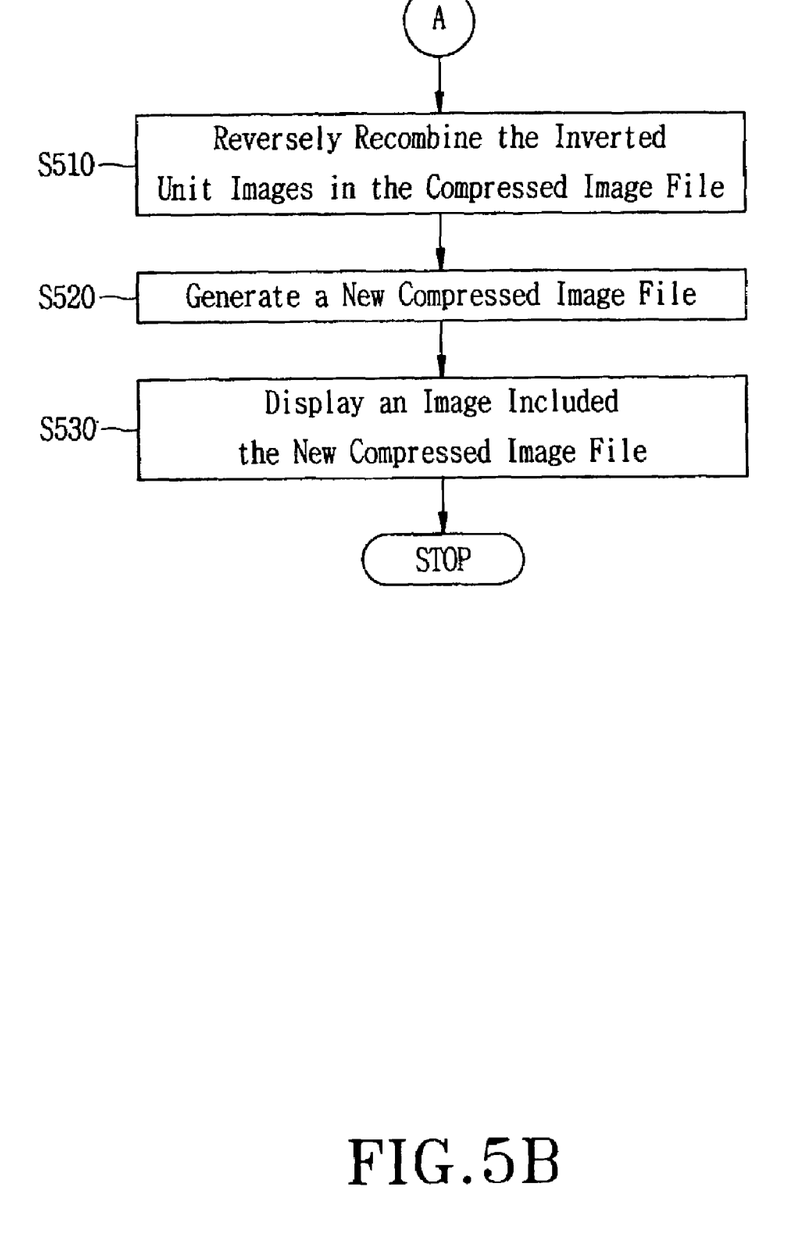
Figure 5C:
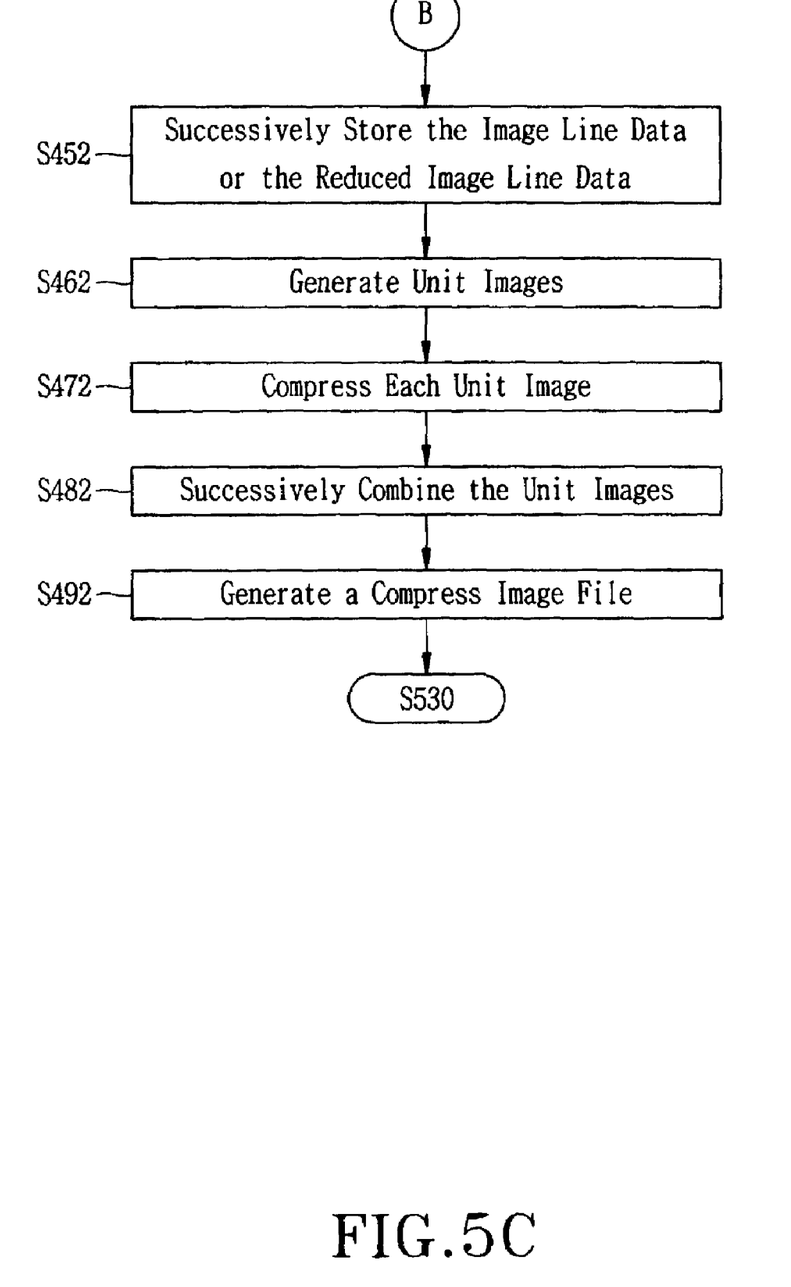

As shown in FIGS. 5A to 5C, the image data control method includes a first process performed by the digital camera 100 and a second process performed by the image display terminal 200. The first process has steps that the digital camera 100 generates the compressed image file and then transfers the same to the image display terminal 200. The second process has steps that the image display terminal 200 displays the image of the object included in the compressed image file.

In other words, the image sensor 120 detects the image of the object captured by the lens 110, and then generates image signals corresponding to the captured image, at step S410. Continuously, the image sensor 120 provides the image signals to the image process unit 140. Then, the image process unit 140 checks whether the first control signal is generated from the command decipher unit 130 or not, at step S420.

When the first control signal is detected during the check step S420, the image data processor 142 reduces the image signals to form the reduced image line data having a predetermined data size, at step S430. On the other hand, when the first control signal is not detected during the check step S420, the image data processor 142 forms the image line data without size change of each image signal, at step S432.

Thereafter, the image process unit 140 checks that the second control signal is generated from the command decipher unit 130 or not, at step S440.

Figure 6A:
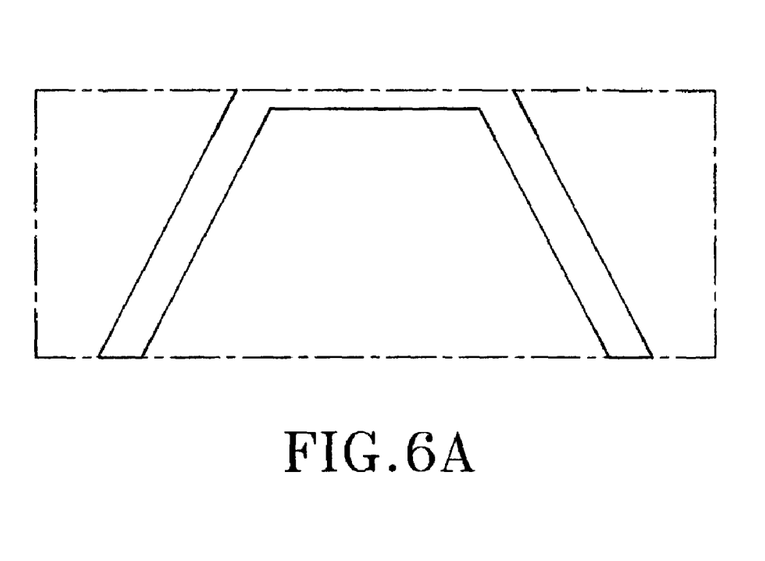
FIGS. 6A and 6B represent unit images formed in a digital camera shown in FIG. 4, when the digital camera is inverted and captures an image of an A-shaped object.
Figure 6B:
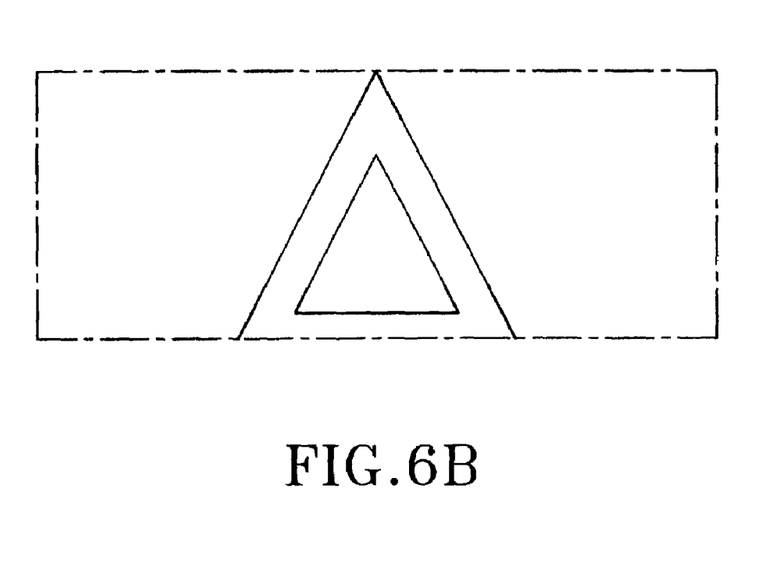

When the second control signal is detected during the step S440, the line data buffer 144 reversely stores the image line data or the reduced image line data into the buffer lines by a predetermined number of the image line data units, at step S450, and generates the inverted unit images, at step S460. Thereafter, the encoder 146 compresses each inverted unit image, at step S470. Then, the encoder 146 attaches the restart marker at the last portion of each inverted unit image compressed, and outputs them. In this case, when the object has shape "A" and the digital camera capturing an image of the object is rotated at 180°, the inverted unit images shown in FIGS. 6A and 6B are outputted from the encoder 146.

Figure 7:
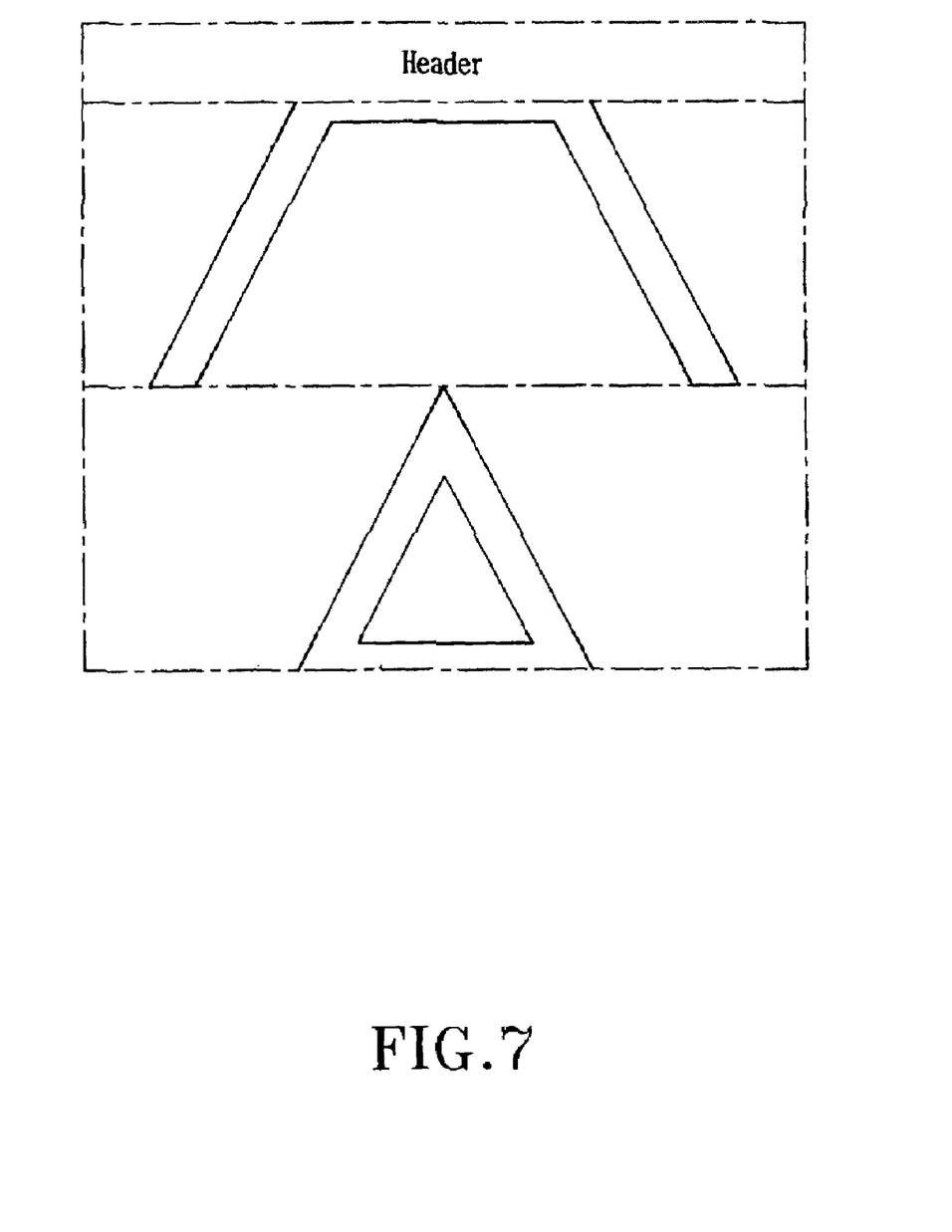
FIG. 7 schematically illustrates a compressed image file generated by combining the unit images shown in FIGS. 6A and 6B.

Then, the unit image buffer 148 successively combines the compressed and inverted unit images outputted from the encoder 146, at step S480, and attaches the header at the top portion of the combined unit images to generate the compressed image file shown in FIG. 7, at step S490. Thereafter, the image process unit 140 transfers the compressed image file to the image display terminal 200 via the interface 150. In this case, the compressed image file transferred to the image display terminal 200 at the step S490 is either the partly inverted image file or the reduced and partly inverted image file. That is, when the step S432 is performed, the compressed image file transferred to the image display terminal 200 at the step S490 is the partly inverted image file. On the other hand, when the step S430 is performed, the compressed image file transferred to the image display terminal 200 at the step S490 is the reduced and partly inverted image file.

Figure 8:
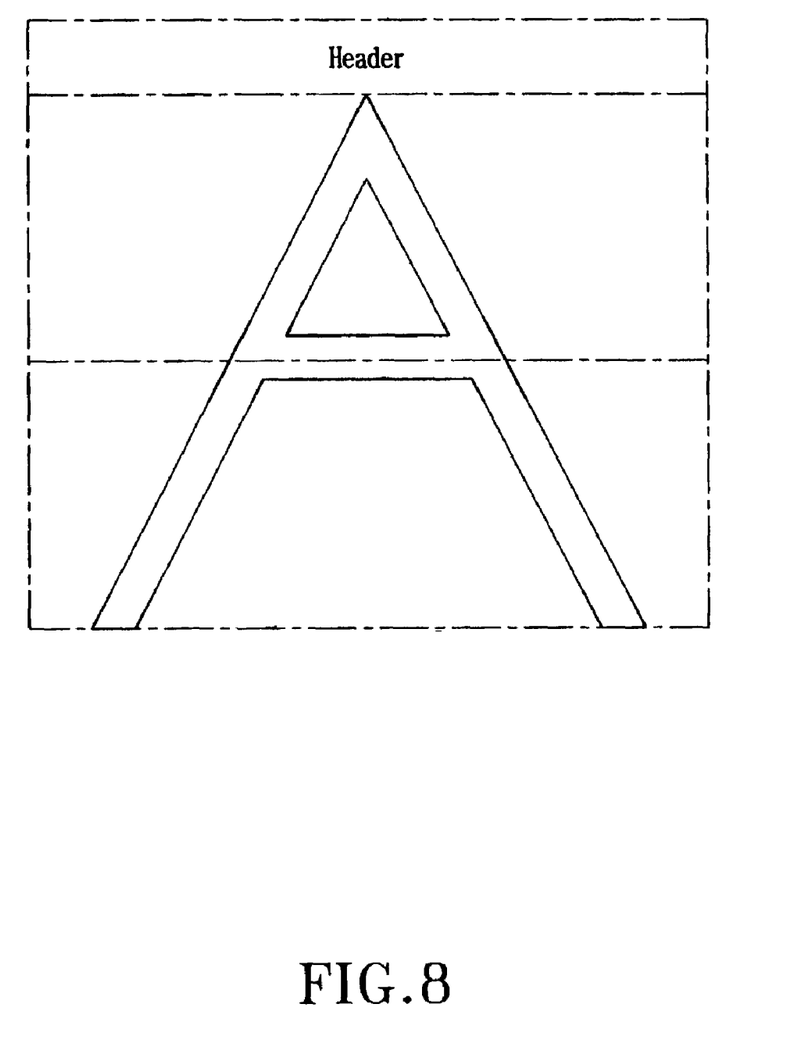
FIG. 8 represents the image displayed by the image display terminal of the system shown in FIG. 4, when a vertical flip command is inputted to the system.

In this case, the image control unit 210 of the image display terminal 200 reversely recombines the compressed and inverted unit images included in the compressed image file, at step S510, and generates the new compressed image file, at step S520. Thereafter, the image control unit 210 provides the new compressed image file to the display 220, so that the display 220 displays the inverted image included in the new compressed image file, as shown in FIG. 8, at step 530. That is, even if the digital camera 100 is rotated and captures the inverted shape of the object, i.e. inverted "A", the image displayed by the image display terminal 200 has the shape "A".

Figure 9A:
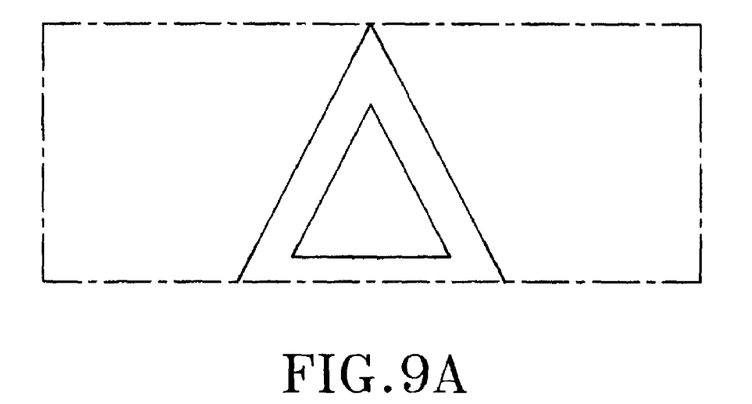
FIGS. 9A and 9B represent unit images formed in the digital camera, when the digital camera of the invention is not inverted and captures the image of the A-shaped object.
Figure 9B:
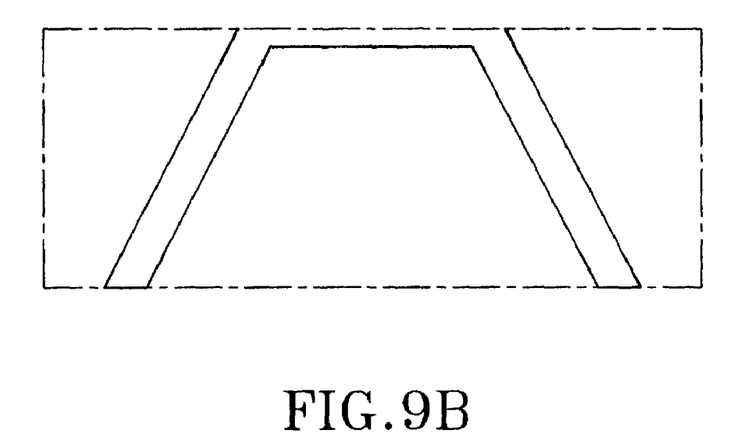

On the other hand, when the second control signal is not detected during the step S440, the line data buffer 144 successively stores the image line data or the reduced image line data into the buffer lines by a predetermined number of image line data units, at step S452, and generates the unit images, at step S462. Thereafter, the encoder 146 compresses each of the unit images, at step S472. Then, the encoder 146 attaches the restart marker at the last portion of each compressed unit image and outputs them. Thus, when the image captured by the digital camera 100 has the A-shape, the compressed unit images include images as shown in FIGS. 9A and 9B, respectively.

Then, the unit image buffer 148 successively combines the compressed unit images outputted from the encoder 146, and attaches the header on the top portion of the combined unit images to generate the compressed image file, at steps S482 and S492. Thereafter, the image process unit 140 transfers the compressed image file to the image display terminal 200 via the interface 150. In this case, the compressed image file transferred to the image display terminal 200 at the step S492 is either the general image file or the reduced image file. That is, when the step S432 is performed, the compressed image file transferred to the image display terminal 200 is the general image file. On the other hand, when the step S430 is performed, the compressed image file transferred to the image display terminal 200 is the reduced image file.

In this case, the image control unit 210 provides the compressed image file to the display 220 to perform the step S530, or transfers the same to the memory 240 in response to the stock command. Then, the image displayed by the display 220 has the A-shape shown in FIG. 8.

As above-mentioned, according to the present invention, power consumption for controlling the image data is reduced and manufacturing cost for realizing the system is remarkably reduced, since the image data control system does not require the decoder, the image flip processor and the encoder in the image display terminal of the conventional system. Further, the system of the present invention can reduce size of the image included in the compressed image file, so that user can see the overall image of the object without the condition of image size captured by the digital camera 100.

Also, according to the image data control system and method of the present invention, image data process speed is increased in comparison with the prior art.

While this invention has been particularly shown and described with reference to the embodiments thereof, it will be understood by those skilled in the art that various changes and equivalents may be made without departing from the spirit and scope of the invention. For example, in the above embodiment, the command input unit 230 is disposed at the image display terminal 200. But, in another embodiment, the command input unit 230 can be disposed at the digital camera 100. Therefore, it is intended that the invention not be limited to the particular embodiment disclosed as the best mode contemplated for carrying out this invention, but that the invention will include all embodiments within the scope of the appended claims.

What is claimed is:

1. An image data control system for capturing and displaying an original image of an object, comprising:
  a digital camera and an image display terminal;
  said digital camera having an image data processor, a first buffer, and a second buffer,
  said image data processor for forming and outputting image line data using image signals, said first buffer for storing said image line data by a predetermined number of said image line data to provide a plurality of unit images, said second buffer for combining said unit images to generate an image file, wherein, upon receipt of a control signal, said first buffer reversely stores said predetermined number of image line data from a top portion of a captured inverted image of an object to create a first inverted unit image, said first buffer reversely stores predetermined number of line data from a second portion of the inverted image which is below said top portion of the inverted image to create a second inverted unit image, and said second buffer combines said first and second inverted unit images in an order that the first inverted unit image is the top portion of the combined image file to generate a partly inverted image file prior to being transferred to said image display terminal; and said image display terminal receiving said inverted image file, said image display terminal having a display for displaying the inverted image.

2. The image data control system in accordance with claim 1, wherein the digital camera includes a lens for capturing the original image of the object; an image detector for detecting the original image captured by the lens, the image detector generating said image signals corresponding to the detected original image.

3. The image data control system in accordance with claim 1, wherein said display terminal comprises an image control unit for reversely recombining said partly inverted image file to generate a new image file and provides the new image file to said display.

4. The image data control system in accordance with claim 3, wherein the digital camera further comprises an encoder for compressing each of the inverted unit images provided from the first buffer, and said encoder providing compressed and inverted unit images to the second buffer.

5. The image data control system in accordance with claim 4, wherein the encoder attaches a predetermined identification at a last portion of each of the compressed and inverted unit images.

6. The image data control system in accordance with claim 5, wherein the second buffer attaches a header at a top portion of the compressed and inverted unit images combined.

7. The image data control system in accordance with claim 1, wherein the image data processor scales a size dimension of the image by reducing each of the image signals so that the image size of the inverted image is smaller than that of the original image captured by a lens.

8. An image data control system for capturing and displaying an original image of an object, comprising the steps of:

(a) generating image signals corresponding to the original captured;

(b) forming image line data using the image signals;

(c) checking whether a vertical flip command is inputted;

(d) generating inverted unit images by storing in an inverted order a predetermined number of the image line data from a top portion of said captured inverted image to create a first inverted unit image and storing in an inverted order a predetermined number of the image line data from a second portion of the inverted image which is below said top portion of the inverted image to create a second inverted unit image when the vertical flip command is inputted prior to being transferred to said image display terminal;

(e) compressing each of the inverted unit images;

(f) combining the compressed inverted unit images in an order that the first inverted unit image is the top portion of the combined image file to generate a compressed inverted image file;

(g) transferring the compressed inverted image files to a display terminal via an interface;

(h) decoding the compressed inverted image files; and (i) displaying the inverted image including in the compressed inverted image file.

9. The image data control method in accordance with claim 8, further comprising the step of:

(j) generating unit images by successively storing the image line data by the predetermined number of the image line data units, when the vertical flip command is not inputted;

(k) combining the unit images to generate a general image file, the general image file including the original image; and (l) displaying the original image included the general image file.

10. The image data control method in accordance with claim 8, wherein said step (i) of displaying the inverted image further comprises (ii) a step of reversely recombining said partly inverted image file to generate a new image file and provides the new image file to said display.

11. The image data control method in accordance with claim 8, further comprising the step of (m) checking whether an image reduction command is inputted, and wherein the step (b) includes (b1) scaling a size of each image by reducing the image signals to generate reduced unit images by storing the reduced line data.

12. The image data control method in accordance with claim 11, further comprising the step of (o) compressing each of the reduced and inverted unit images.

13. An image data control system for capturing and displaying an original image of an object, comprising:

an image display terminal; and a digital camera, the digital camera rotatably connected to the image display terminal, said digital camera having an image data processor for forming and outputting image line data using image signals, means for storing said image line data by a predetermined number of said image line data to provide a plurality of unit images, and means for combining said unit images to generate an image file, and wherein said means for storing said image line data reversely stores said predetermined number of image line data from a top portion of a captured inverted image of an object to create a first inverted unit image upon receipt of control signal to provide a plurality of inverted unit images and said means for storing said image line data reversely stores said predetermined number of image line data form a second portion of the inverted unit image which is below said top portion of the inverted image to create a second inverted unit image, and said means for combining said unit images combines the inverted unit images in an order that the first inverted unit image is the top portion of the combined image file to generate an inverted image file, prior to being transferred to said image display terminal;

said image display terminal receiving said inverted image file, said image display terminal having a display for displaying the inverted image.

14. The image data control system in accordance with claim 13, wherein said display terminal comprises an image control unit for reversely recombining said partly inverted image file to generate a new image file and provides the new image file to said display.

15. The image data control system in accordance with claim 13, wherein the digital camera further comprises an encoder for compressing each of the inverted unit images provided form said means for storing said image line data, and said encoder providing compressed and inverted unit images to said means for combining said unit images.

* * * * *

UNITED STATES PATENT AND TRADEMARK OFFICE
CERTIFICATE OF CORRECTION

PATENT NO. : 7,215,367 B2
APPLICATION NO. : 10/200801
DATED : May 8, 2007
INVENTOR(S) : Sung Min Lee, Sang Hyung Park and Hyeong Ik Yun It is certified that error appears in the above-identified patent and that said Letters Patent is hereby corrected as shown below:

Claim 1, Col. 9, line 10, prior to the word "predetermined" insert -- said--

Claim 1, Col. 9, line 11, prior to the word "line" insert -- image --

Claim 8, Col. 9, line 53, delete "system" and replace with -- method --

Claim 8, Col. 9, line 57, prior to the word "captured" insert -- image --

Claim 8, Col. 10, line 12, delete "including" and replace with -- included --

Claim 11, Col. 10, line 37, prior to the word "line" insert -- image --

Claim 13, Col. 10, line 44, prior to the word "rotatably" insert -- being --

Claim 13, Col. 10, line 61, delete "form" and replace with -- from --

Claim 13, Col. 10, line 62, delete "unit"

Claim 15, Col. 12, line 6, delete "form" and replace with -- from --

Signed and Sealed this

Seventh Day of August, 2007

JON W. DUDAS
*Director of the United States Patent and Trademark Office*